Dec. 24, 1940. T. C. CROSSMAN Re. 21,671

BRAKE RIGGING

Original Filed Dec. 22, 1938

INVENTOR
Theodore C. Crossman
BY
ATTORNEY

Reissued Dec. 24, 1940

Re. 21,671

UNITED STATES PATENT OFFICE 21,671

BRAKE RIGGING

Theodore C. Crossman, Wilkinsburg, Pa., assignor to The American Brake Company, Swissvale, Pa., a corporation of Missouri Original No. 2,199,128, dated April 30, 1940, Serial No. 247,253, December 22, 1938. Application for reissue September 4, 1940, Serial No. 355,377

5 Claims. (Cl. 188—190)

My invention relates to brake rigging for railway rolling stock, and particularly to brake rigging for the driving wheels of locomotives.

In modern high speed locomotives it is desirable to arrange one or more of the wheel and axle assemblies for lateral movement with respect to the locomotive frame in order to permit the wheels to freely follow the track rails on curves or over uneven stretches of track without undue thrust of the wheels on the rails. When the wheels are arranged for lateral movement in this manner, it is desirable to maintain the brake shoes in lateral alignment with the wheel rims with which they cooperate to insure efficient braking and to avoid undue wear on the brake rigging, and one object of my invention is to provide novel means for accomplishing this desirable result.

The structure forming the subject matter of my present invention is an improvement upon that shown and described in a copending application for Letters Patent of the United States, Serial No. 248,652, filed by Emil G. Mueller, on December 31, 1938, for Brake rigging.

I shall describe one form of brake rigging embodying my invention, and shall then point out the novel features thereof in claims.

Figure 1:
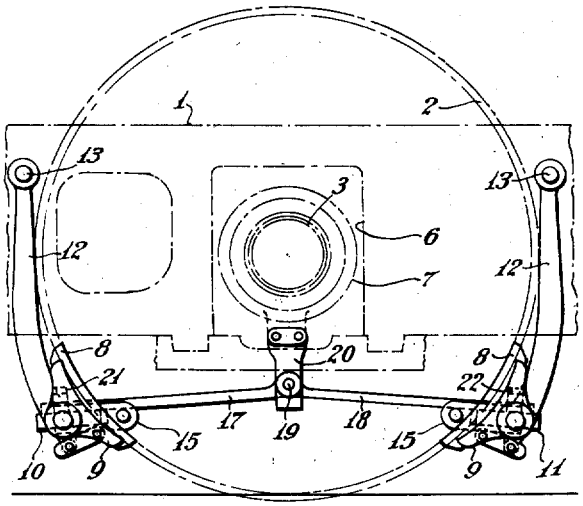
Figure 3:
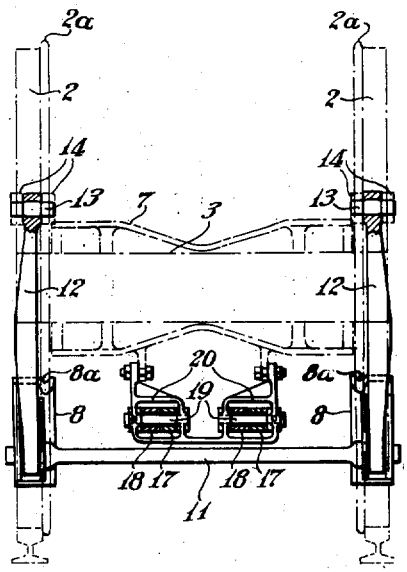
Figure 2:
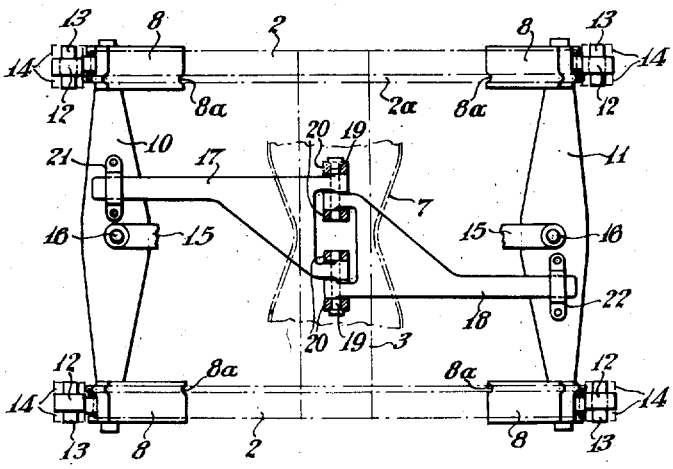

In the accompanying drawing, Fig. 1 is a fragmentary side elevational view of a portion of a railway vehicle provided with brake rigging embodying my invention. Fig. 2 is a plan view of the portion of the vehicle shown in Fig. 1. Fig. 3 is a right-hand end view of the portion of the vehicle shown in Fig. 1.

Similar reference characters refer to similar parts in each of the several views.

Referring to the drawing, I have here shown my invention applied to a locomotive having a rigid frame 1 and a pair of driving wheels 2 mounted on an axle 3 comprising part of a roller bearing axle assembly the construction of which forms no part of my present invention and is therefore not illustrated in the drawing. It should be particularly pointed out, however, that this axle assembly includes a journal box at each end which is guided by spaced pedestal jaws 6 formed on the side member of the frame in such manner that the journal box is free to slide both vertically and laterally with respect to the frame, and a member 7 which connects the two journal boxes and is movable laterally in response to lateral movement of the wheels. The member 7 may assume a variety of forms depending upon the particular type of roller bearing construction employed, and is here shown as being tubular in construction. This member is referred to in the art by a variety of different designations, but for convenience I shall hereinafter refer to it as an axle housing although it should be distinctly understood that insofar as my present invention is concerned its exact construction is immaterial so long as it is a non-rotatable member which moves laterally with, and in response to, lateral movement of the associated wheels.

The brake rigging comprises brake shoes 8 secured to brake heads 9 mounted on the rounded ends of brake beams 10 and 11 disposed on opposite sides of the wheels 2. The brake beams are suspended from the locomotive frame by means of hangers 12, each of which is pivotally connected at its lower end with one end of the associated brake beam, and is pivotally supported at its upper end on a pin 13 mounted in spaced lugs 14 provided on the engine frame. Each brake shoe 8 is preferably formed with a groove 8a which engages a flange 2a of the associated wheel when braking, and in order to permit necessary lateral rocking movement of the hangers 12 to enable the brake shoes to freely follow the lateral movement of the wheels 2, the portion of each pin 13 on which the associated hanger is pivoted is made barrel shaped, as best seen in Figs. 2 and 3. A member 15 which may be connected to any suitable brake actuating mechanism is pivotally connected to the center of each brake beam 10 and 11 by means of a pin 16, and these members serve as means for moving the brake beams toward the wheels to their brake applying positions in which the brake shoes frictionally engage the wheels. One form of brake actuating mechanism which is suitable for this purpose is shown and described in the hereinbefore referred to Mueller application.

In accordance with my present invention means are provided for maintaining the brake shoes in lateral alignment with the wheels at all times. As here shown these means comprise two similar rigid arms 17 and 18 which are pivotally attached at one end by means of laterally spaced pivot pins 19 to a bracket 20 bolted to, or cast integral with, the housing 7. These arms extend in opposite directions from the housing 7, and are operatively connected at their free ends with the brake beams 10 and 11, respectively, by means of inverted U-shaped brackets or stirrups 21 and 22 which are bolted to the brake beams, and which form with the brake beams openings through which the free ends of the arms extend.

The operation of my improved mechanism for maintaining the brake shoes in alignment with the wheels will be apparent from an inspection of the drawing. As the wheels move laterally in either direction due either to a curve or to uneven spacing of the rails, the housing 7 is moved with the wheels, and the lateral motion of this housing is transmitted through the medium of the bracket 20, the pins 19, the arms 17 and 18, and the stirrups 21 and 22 to the brake beams 10 and 11, thereby causing these brake beams to move laterally with the housing, and hence causing the shoes to remain in alignment with the wheels.

One advantage of the structure embodying my invention is that it employs a minimum number of parts all of which are inexpensive to build.

Although I have herein shown and described only one form of brake rigging embodying my invention, it is to be understood that various changes and modifications may be made therein within the scope of the appended claims without departing from the spirit and scope of my invention.

Having thus described my invention, what I claim is:

1. In a railway vehicle comprising a frame, a wheel and axle assembly arranged for lateral movement relative to said frame and including an axle housing movable therewith, in combination, a brake beam suspended from the frame for lateral movement relative thereto and carrying brake shoes for cooperation with the wheels, and an arm attached at one end to said housing intermediate the wheels and operatively connected at the other end directly with said brake beam and effective to move said brake beam in a manner to maintain said brake shoes in lateral alignment with the wheels.

2. In a railway vehicle comprising a frame and a wheel and axle assembly arranged for lateral movement relative to said frame and including an axle housing movable therewith, in combination, a brake beam suspended from the frame for lateral movement relative thereto and carrying brake shoes for cooperation with the wheels, a bracket secured to said housing, and a rigid arm pivotally attached at one end to said bracket by means of laterally spaced pivot pins and operatively connected at the other end directly with said beam for maintaining said brake shoes in lateral alignment with said wheels.

3. In a railway vehicle comprising a frame and a wheel and axle assembly arranged for lateral movement relative to said frame and including an axle housing movable therewith, in combination, a brake beam suspended from the frame for lateral movement relative thereto and carrying brake shoes for cooperation with the wheels, a bracket secured to said housing, and a rigid arm pivotally attached at one end to said bracket by means of laterally spaced pivot pins and operatively connected at the other end with said beam by means of a U-shaped stirrup which is bolted to the beam and which forms with said beam an opening through which the arm extends, whereby said brake shoes are maintained in alignment with the wheels.

4. In a railway vehicle comprising a frame and a wheel and axle assembly arranged for lateral movement relative to said frame and including an axle housing movable therewith, in combination, two brake beams suspended on opposite sides of said wheel and axle assembly for lateral movement relative to said frame, a bracket secured to said housing, and two rigid arms each pivotally attached at one end to said bracket and each operatively connected at the other end directly with a different one of said beams for maintaining said brake shoes in alignment with the wheels.

5. In a railway vehicle comprising a frame and a wheel and axle assembly arranged for lateral movement relative to said frame and including an axle housing movable therewith, in combination, two brake beams suspended on opposite sides of said wheel and axle assembly for lateral movement relative to said frame, and two rigid arms each operatively connected at one end with said housing and at the other end directly with a different one of said brake beams for maintaining said brake beams in alignment with the wheels.

THEODORE C. CROSSMAN.